United States Patent [19]

Matsuzaki et al.

[11] 3,874,960
[45] Apr. 1, 1975

[54] METHOD FOR MUTUALLY CONNECTING SUBMARINE COAXIAL CABLES OF DIFFERENT OUTSIDE DIAMETERS

[75] Inventors: Akira Matsuzaki, Yokohama; Terasu Hamura, Tokyo, both of Japan

[73] Assignee: Kokusai Cable Ship Kabushiki Kaisha, Tokyo-to, Japan

[22] Filed: Aug. 14, 1973

[21] Appl. No.: 388,171

Related U.S. Application Data

[63] Continuation of Ser. No. 137,362, April 26, 1971, abandoned.

[52] U.S. Cl. ............................... 156/49, 174/88 C
[51] Int. Cl. .......................................... B21f 15/02
[58] Field of Search ............ 156/49; 174/88 R, 88 C; 29/628

[56] References Cited
UNITED STATES PATENTS

| | | | |
|---|---|---|---|
| 2,768,105 | 10/1956 | Dittmore et al. | 174/88 C |
| 3,332,813 | 7/1967 | Clark | 174/88 C |
| 3,515,608 | 6/1970 | Nuccio | 156/49 |

*Primary Examiner*—Charles E. Van Horn
*Assistant Examiner*—David A. Simmons
*Attorney, Agent, or Firm*—Robert E. Burns; Emmanuel J. Lobato; Bruce L. Adams

[57] ABSTRACT

A method for mutually connecting submarine coaxial cables of different outside diameters to repair a trouble of a fault point of a laid submarine cable system on a cable ship, in which before connecting the inner conductors of the submarine cables an inner insulator of larger one of the submarine coaxial cables is tapered, after shaping of an inner conductor, the inner insulator and an outer conductor to expose by respective desired lengths, so as to provide a tapered portion and a remainder. The tapered portion has a length determined suitably for a minimum radius of curvature of said larger one. The remainder having a desired length and a diameter equal to that of a smaller one of the submarine coaxial cables. A conductive tape having a plurality of slits along the longitudinal direction thereof at regular intervals is wrapped on the tapered portion after connecting the inner conductors of the submarine cables bot before welding and moulding.

6 Claims, 29 Drawing Figures

Fig. 5 L

METHOD FOR MUTUALLY CONNECTING SUBMARINE COAXIAL CABLES OF DIFFERENT OUTSIDE DIAMETERS This is a continuation, of application Ser. No. 137,362, filed Apr. 26, 1971, now abandoned.

This invention relates to methods for mutually connecting submarine coaxial cables of different outside diameters.

Communication systems using submarine coaxial cables are broadly used as important main lines for overseas communication. In communication systems using submarine cables, a number of repeaters are inserted in the submarine coaxial cable in regular intervals of twenty sea miles (at the Over-Pacific cable system laid through Japan, Guam, Hawaii and U.S.A.) or of seventeen sea miles (at the Japan Sea cable system laid from Naoetsu in Japan to Nakhodka in U.S.S.R.) to compensate for signal loss in the coaxial cable. If a fault (e.g.; a fault of a repeater; breakdown of the coaxial cable; etc) occurs in the cable communication system, long time and skilled laborers are required to repair the trouble unlike a landcable system. In this repair work, search for the laid submarine cable and the connection of the breakdown cables particularly requires a long time. Accordingly, if the time for performing any of this work can be reduced, the overall time can be extremely reduced. In this case, a minimum repair cost is also required.

An object of this invention is to provide a method for mutually connecting submarine coaxial cables having different outside diameters in a minimum of time and cost from the above-mentioned point of view.

The principle of this invention will be understood from the following more detailed discussion taken in conjunction with the accompanying drawings, in which the same or equivalent parts are designated by the same reference numerals, characters, and symbols, and in which.

Figure 1A:
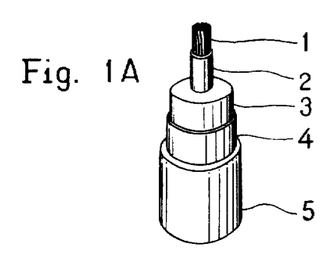
FIGS. 1A and 1B are respectively a perspective view and a section illustrating the construction of a submarine coaxial cable.
Figure 1B:
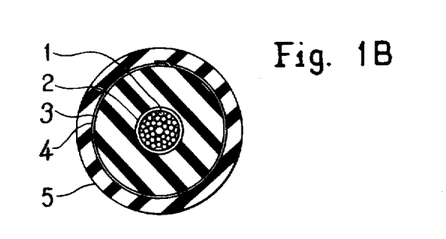

A usual submarine coaxial cable comprises, as shown in FIGS. 1A and 1B, steel-stranded wires 1, an inner conductor 2, an inner polyethylene insulator 3, an outer conductor 4, and a black outer polyethylene insulator 5. If fault occurs in a cable system using such a submarine coaxial cable, the following method is generally adopted. Firstly, a rough fault position is detected from fault position information which is obtained by transmitting measuring signals of various frequencies, a particular frequency being associated with a particular repeater, to all the repeaters in a fixed relationship. Thereafter, a cable ship is brought to the periphery of the detected rough fault position to search for the faulty cable. This process is described with reference to FIGS. 2A to 2F.

Figure 2A:
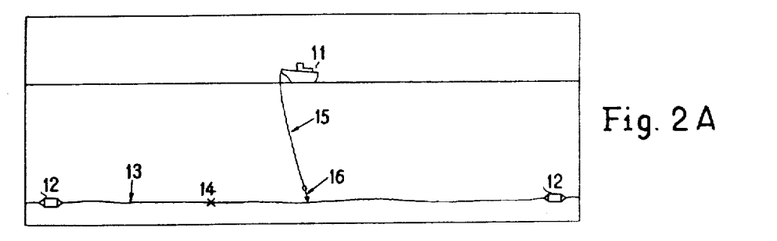
FIGS. 2A to 2F are schematic views explanatory of steps for repairing a fault in a coaxial cable system.
Figure 2B:
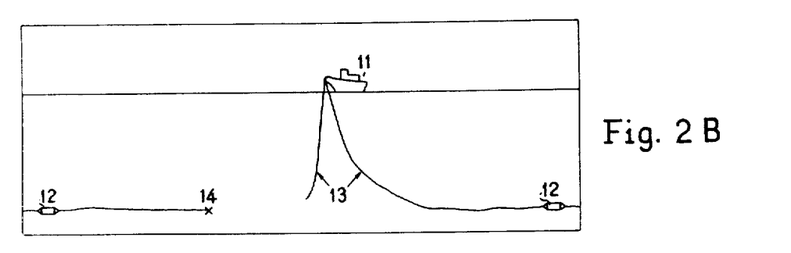
Figure 2C:
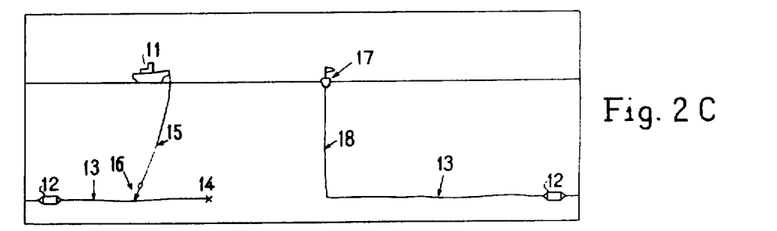
Figure 2D:
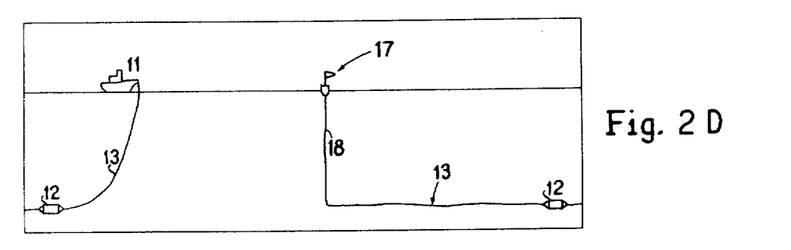
Figure 2E:
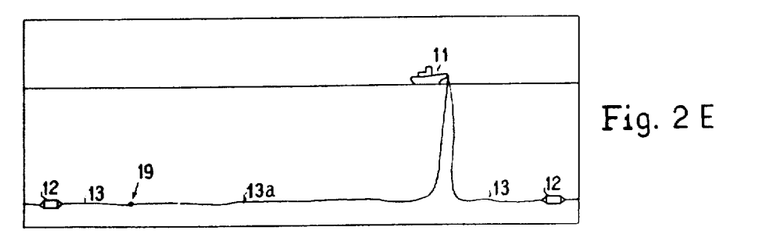
Figure 2F:
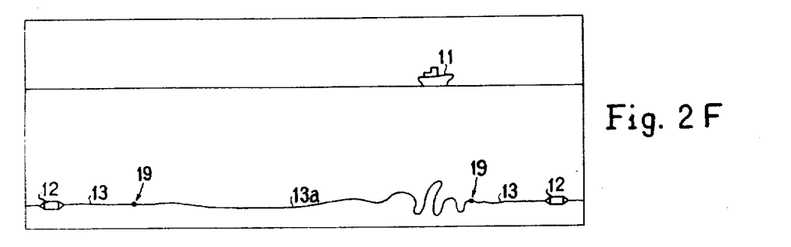

In FIG. 2A, a cable ship 11, repeaters 12, a coaxial cable 13, a breakdown point 14, a searching rope 15 and a searching anchor 16 are shown. The cable 13 caught by the searching anchor 16 is drawn up to the cable ship 11 as shown in FIG. 2B. The drawn-up cable 13 is cut to exclude the unusable part thereof caused by the catch by the searching anchor 16 and then temporarily attached to a buoy rope 18 connected to a buoy 17 see FIG. 2, after being electrically tested. The remainder of the faulty cable 13 is searched for similarly as shown in FIG. 2C and drawn up on the cable ship 11 as shown in FIG. 2D. The drawn-up remainder is similarly cut and connected at a point 19 to an insertion cable 13a after having been electrically tested. The insertion cable 13a is laid together with the remainder along the direction to the buoy 17. After reaching the buoy 17, the insertion cable 13a and the part of the coaxial cable 13 attached to the buoy 17 are mutually connected on the cable ship 11 as shown in FIG. 2E after redrawing up of the cable 13. The connected cables 13 and 13a are sunk as shown in FIG. 2F.

Figure 3A:
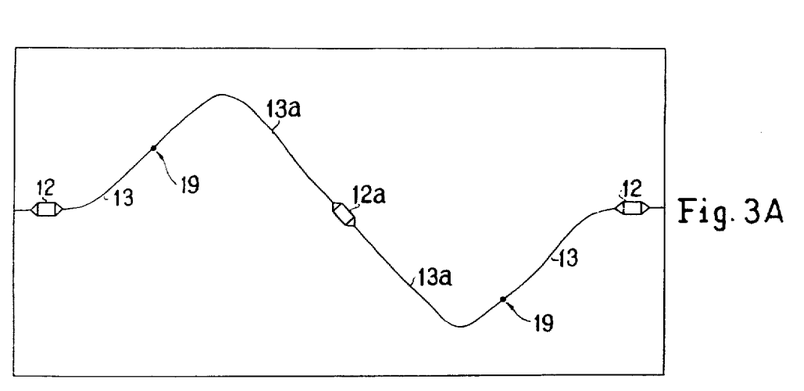
FIGS. 3A and 3B are schematic views explanatory of the disposition of a repaired coaxial cable system.
Figure 3B:
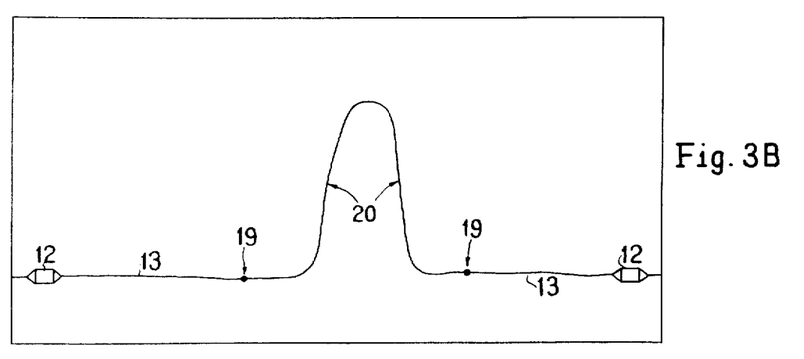

As a result of the above mentioned repairing steps, the length of a single span between adjacent repeaters is increased by more than twice the depth of water at the fault point. However, an allowable error of the length of the single span, which can be compensated by a repeater, is approximately $\pm 5\%$. Accordingly, a new repeater 12a is necessarily inserted in the long insertion cable 13a in accordance with conventional art as shown in FIG. 3A when the depth of water reaches 1,500 meters. This is not desirable in view of the cost and time.

To eliminate the above mentioned defects, a coaxial cable 20 having a diameter larger than that of the laid submarine coaxial cable 13 is employed as the insertion cable. Since the coaxial cable 20 having a larger diameter has a transmission loss smaller than that of the laid submarine coaxial cable 13, an error due to a single span of larger coaxial cable between adjacent repeaters can be sufficiently compensated by the already established repeaters 12. Thus a new repeater is not necessary even if the depth of the water is 1,500 meters, when an insertion cable of larger diameter having a length of up to (e.g.; three or four sea miles) is connected. Accordingly, time and cost are greatly reduced.

As now used a submarine cable has an outside diameter of one inch at the inner insulator 3 shown in FIGS. 1A and 1B. If the outside diameter of the inner insulator 3 increases to 1.5 inches under the same diameter of the inner conductor 2, the loss of current through the cable can be reduced to two thirds of what it was with a one diameter insulator 3. Accordingly, if an insertion cable having an outside diameter of 1.5 inches at the inner insulator 3 (hereinafter called a "1.5 inch cable") is employed, the length of a single span can be sufficiently increased. However, the problem of mutually connecting submarine cables having inner insulators of different outside diameters still must be resolved.

Figure 4A:
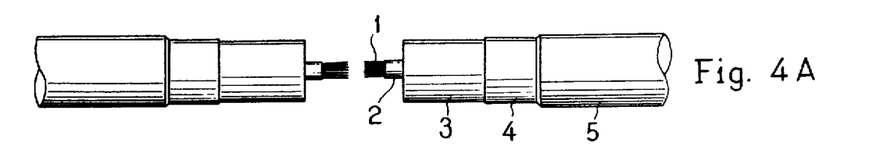
FIGS. 4A to 4G are plan views explanatory of conventional steps for connecting coaxial cables having the same outside diameter.
Figure 4B:
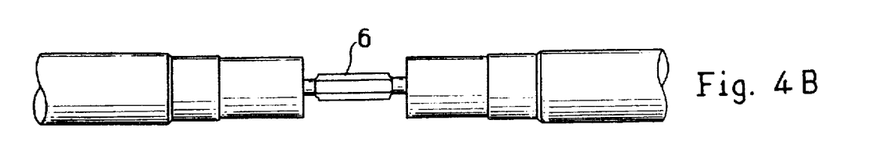
Figure 4C:
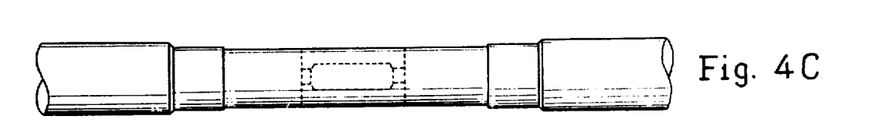
Figure 4D:
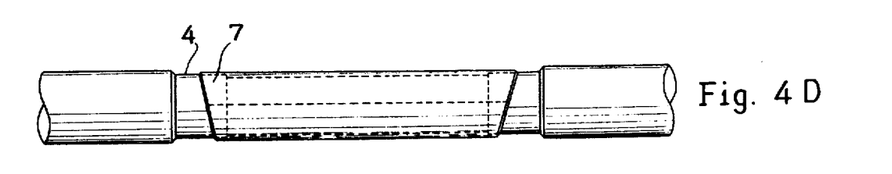
Figure 4E:
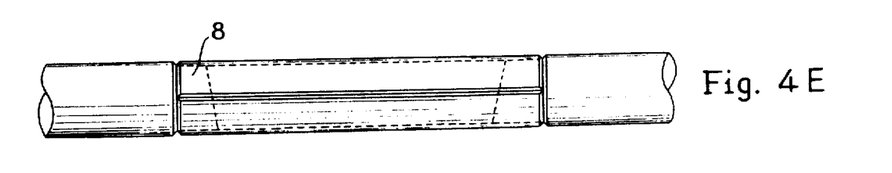
Figure 4F:
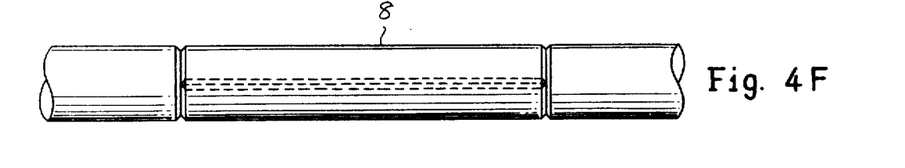
Figure 4G:
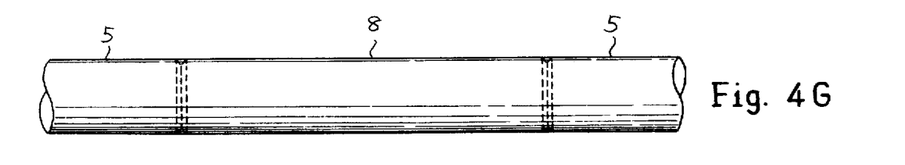

If respective diameters of the submarine coaxial cables to be mutually connected are the same, portions 1, 2, 3 and 4 of submarine cables are shaped so that equal lengths of these portions are exposed on each of the two cables as shown in FIG. 4A. The shaped respective inner conductors 2 are connected to each other by the use of a sleeve 6 as shown in FIG. 4B. Respective polyethylene inner insulators 3 are moulded as shown in FIG. 4C. A copper tape 7 is welded to respective outer conductors 4 as shown in FIG. 4D. A longitudinally-slit jacket 8 is set as shown in FIG. 4E and the slit thereof is seam-welded as shown in FIG. 4F. Finally junction parts between each of the respective ends of the outer insulators 5 and each end of the jacket 8 are moulded on as shown in FIG. 4G.

However, it is very difficult to mutually connect submarine coaxial cables of different diameters without deterioration of the electric properties while retaining sufficient mechanical strength.

It might seem easy to shape the inner insulator of the 1.5 inch cable to a diameter of one inch by tapered-molding. However, since the moulded volume is large, voids and contraction readily occur. Accordingly, this shaping is very troublesome and necessitates a very long time in an actual repair work on the cable ship.

In accordance with the present invention, submarine cables of different diameters can be readily connected to each other at a reduced working time so as to obtain the mechanically and electrically complete connection. The method of this invention is described in detail with reference to an example.

Figure 5A:
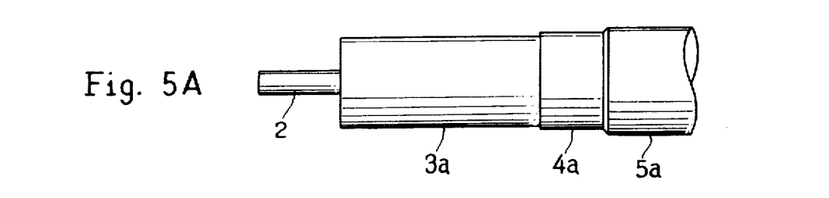
FIGS. 5A to 5L are plan views explanatory of steps for connecting coaxial cables of different outside diameters in accordance with this invention.
Figure 5B:
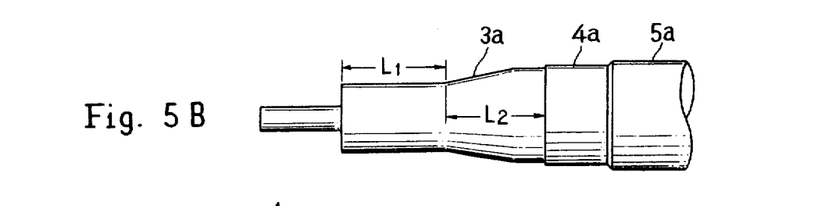

Firstly, a desired length of the inner insulator 3a of a 1.5 inch cable is exposed as shown in FIG. 5A, the cable also having an outer conductor 4a and an outer insulator 5a. A part of the exposed inner insulator 3a is tapered towards the end of the cable by the use of a taper machine, similar to a pencil-sharpener, to provide a transitional tapered portion as shown in FIG. 5B, so that the exposed insulator 3a then comprises a length $L_2$, of which the greater part is tapered and a portion of length $L_1$ having a uniform diameter of one inch. It is desirable that the length $L_2$ is as short as possible to reduce the necessary time needed for the tapering step and the amount of welding needed to connect the outer conductors as mentioned below. However, the minimum radius of curvature of a submarine coaxial cable is determined by its diameter. For example, the minimum radius of curvature is 5 feet for a 1.5 inch cable and three feet for a one inch cable.

The length of the tapered transitional portion must be of such a length that the transition from one radius of curvature to the others is gradual, but at the same time it must not be unnecessarily long.

Figure 5C:
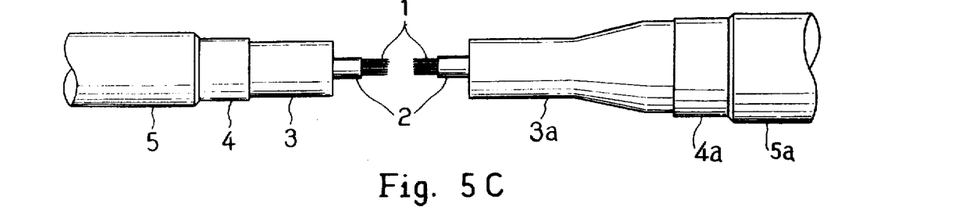
Figure 5D:
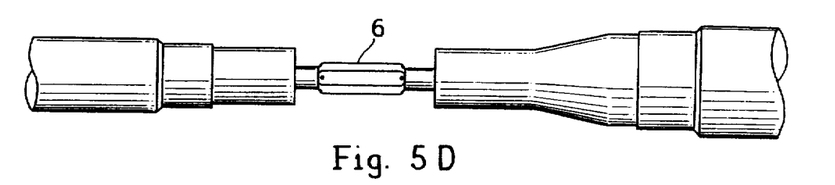
Figure 5E:
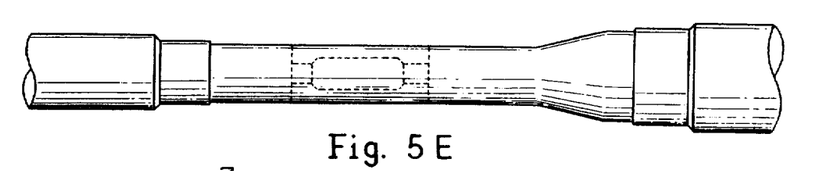
Figure 5F:
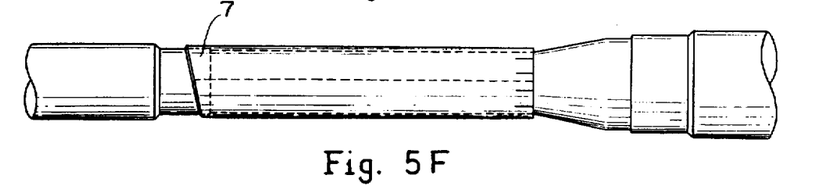

After the above tapering step, respective portions 1 and 2 of the 1.5 inch cable and the one inch cable are shaped as shown in FIG. 5C so as to be exposed over their respective desired lengths. A connection is then made by a sleeve 6, the inner insulators are moulded together, and copper tape 7 is welded to the outer conductors 4, 4a as shown in FIGS. 5D, 5E and 5F similarly to the above mentioned steps in the connection of submarine cables of the same diameter.

Figure 5G:
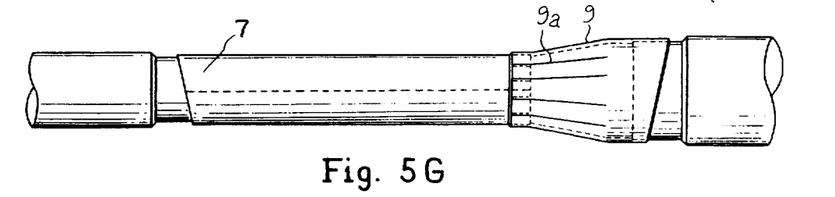

In welding the tapered transitional portion, a copper tape 9 having a width greater than the width of the copper tape 7 is closely wrapped on the tapered portion as shown in FIG. 5G after providing a plurality of longitudinal slits 9a (e.g. eight slits) at regular intervals to enable the tape to conform to the tapered portion.

The copper tape 7 and the copper tape 9 may be a single tape having a wider portion to be wrapped on the tapered portion. In this case, a plurality of slits are provided in the wider portion at regular intervals.

Figure 5H:
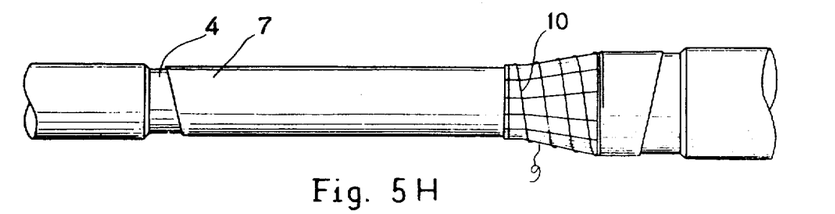
Figure 5I:
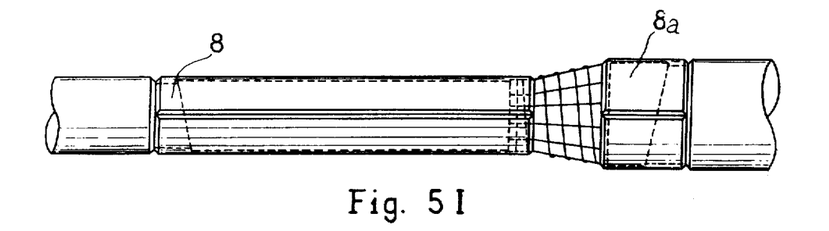

Before welding a nickel-silver wire 10 is wound on the tapered portion as shown in FIG. 5H to bind the copper tape 9 to the tapered inner insulator 3a. Longitudinally-slit jackets 8 and 8a are set as shown in FIG. 5I.

Figure 5J:
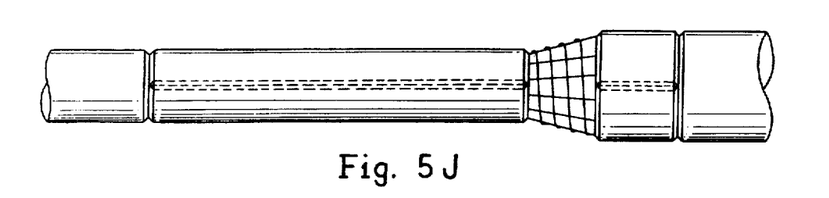

Respective slits of the jackets 8 and 8a are seam-welded as shown in FIG. 5J.

Figure 5K:
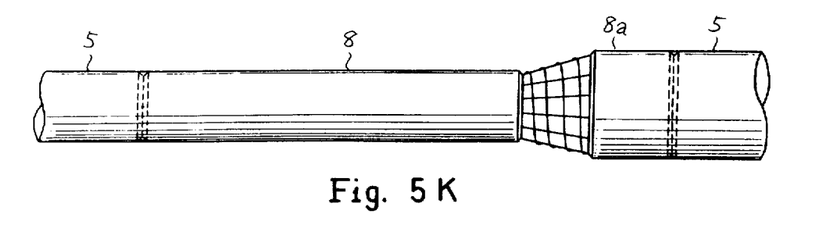

Respective junction parts between each of the respective ends of the outer insulators 5 and each end of the jackets 8 and 8a are moulded on as shown in FIG. 5K.

Figure 5L:
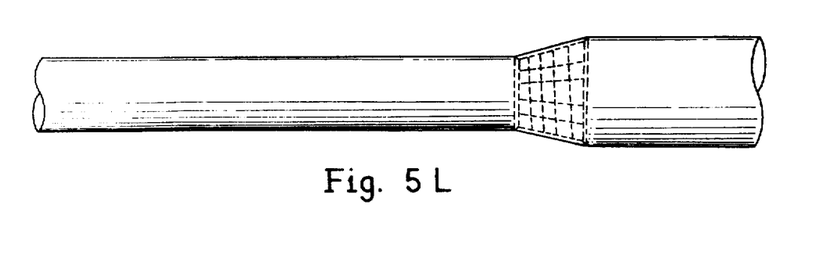

Finally, additional material is moulded on the tapered portion to connect the jackets 8 and 8a as shown in FIG. 5L.

In the method of this invention, the inner insulator 3 (3a) are not melted so that cooling is not necessary. Accordingly, the time necessary for repair can be greatly reduced. Moreover, a complete connection having a sufficient mechanical strength can be performed by a simple process. Furthermore, since a repeater of high cost is not necessary in the insertion cable, the resultant cost for repairing a fault in a coaxial cable system can be greatly reduced.

What we claim is:

1. A method for connecting coaxial cables having different cross-sections, each of said cables having an inner conductor, an inner insulator surrounding said inner conductor, an outer conductor surrounding said inner insulator, and an outer insulator surrounding said outer conductor, said method comprising the steps of: providing two coaxial cables one of which has a larger cross-sectional inner insulator, larger outer conductor and larger outer insulator than the other cable; exposing desired lengths of said inner conductor, said inner insulator and said outer conductor of each coaxial cable; shaping the exposed inner insulator of only the larger cross-sectional coaxial cable to form a first portion having a cross-section equal to the cross-section of the inner insulator of the smaller cross-sectional coaxial cable, a second portion having a cross-section equal to the larger cross-sectional inner insulator, and a tapered transistional portion tapering from said second portion to said first portion; connecting the inner conductor of the larger cross-sectional coaxial cable to the inner conductor of the smaller cross-sectional coaxial cable; moulding a layer of insulation around the exposed connected together inner conductors such that the moulded layer contacts both ends of each the inner insulator of the smaller cross-sectional coaxial cable and the first portion of the inner insulator of the larger cross-sectional coaxial cable; placing a layer of conductive material around the moulded layer of insulation, the exposed portions of the inner insulator of the smaller cross-sectional coaxial cable, said first portion, said tapered transistional and said second portion of the larger cross-sectional coaxial cable and around a portion of the exposed outer conductors of each coaxial cable; welding said layer of conductive material to the exposed portion of the outer conductors; and moulding a layer of insulation around said layer of conductive material.

2. A method according to claim 1; wherein said step of placing conductive material comprises the steps of placing a first sleeve of conductive material around said moulded layer of insulation, said exposed portion of the smaller cross-sectional coaxial cable, and said first portion of said larger cross-sectional coaxial cable, and placing a tapered transitional sleeve of conductive material around a portion of the outer conductor, said tapered transistional portion and said second portion of the inner insulator of the larger cross-sectional coaxial cable, and around a portion of said first sleeve.

3. A method according to claim 2; including the step of winding a nickel-silver wire around said tapered-transistional sleeve to bend it to the inner insulator of the larger cross-sectional coaxial cable.

4. A method for connecting together two submarine coaxial cables each of which has an inner conductor, an inner insulator, an outer conductor, and an outer insulator successively surrounding one another, the diameter of the inner insulator of a larger one of the cables being greater than that of the other smaller cable, the method comprising the following steps: exposing lengths of the inner conductors, inner insulators and outer conductors of both cables; tapering at least part of the exposed portion of the inner insulator of the larger one of the submarine coaxial cables so as to provide a tapered portion and a remainder, the tapering being in a direction towards the end of the cable, and the remainder extending from the smaller diameter end of the tapered portion, the remainder having a diameter equal to the diameter of the inner insulator of the smaller one of the submarine coaxial cables; connecting together the respective exposed inner conductors by means of a sleeve; moulding said connection of the inner connector in insulating material equivalent in physical properties to the inner insulator, so as to connect the inner insulators with an insulating portion having the same diameter as the inner insulator of the smaller cable and the remainder portion of the larger cable; wrapping at least one conductive tape of a material equivalent in physical properties to the outer conductor on the exposed inner insulators and the moulded portion, the conductive tape having a plurality of slits along the longitudinal direction thereof at regular intervals to enable the tape to conform to the surface of the tapered portion; welding the conductive tape to each outer conductor; and moulding on to the exposed outer conductors and the wrapped conductive tape an insulating material equivalent in physical properties to the outer insulator.

5. A method according to claim 4, further comprising winding a nickel-silver wire on the conductive tape on the tapered portion before welding.

6. A method according to claim 4, in which two conductive tapes are used, one of which covers at least the tapered portion and the other of which covers the connection of the inner insulators and those parts of the exposed inner insulators which have the diameter of the inner insulator of the smaller cable.

* * * * *